US008347098B2

(12) United States Patent
Farrugia et al.

(10) Patent No.: US 8,347,098 B2
(45) Date of Patent: Jan. 1, 2013

(54) MEDIA STORAGE STRUCTURES FOR STORING CONTENT, DEVICES FOR USING SUCH STRUCTURES, SYSTEMS FOR DISTRIBUTING SUCH STRUCTURES

(75) Inventors: Augustin J. Farrugia, Cupertino, CA (US); Gianpaolo Fasoli, Palo Alto, CA (US); Bertrand Mollinier Toublet, Los Gatos, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 1350 days.

(21) Appl. No.: 11/752,276

(22) Filed: May 22, 2007

(65) Prior Publication Data

US 2008/0294901 A1 Nov. 27, 2008

(51) Int. Cl.
*H04L 29/06* (2006.01)
(52) U.S. Cl. .............. 713/176; 713/189; 726/2; 380/261
(58) Field of Classification Search .................. 713/176, 713/189; 726/2; 380/261
See application file for complete search history.

(56) References Cited

U.S. PATENT DOCUMENTS

| | | | |
|---|---|---|---|
| 5,103,476 | A | 4/1992 | Waite et al. |
| 5,892,900 | A | 4/1999 | Ginter et al. |
| 5,933,497 | A | 8/1999 | Beetcher et al. |
| 5,982,891 | A | 11/1999 | Ginter et al. |
| 6,076,077 | A | 6/2000 | Saito |
| 6,385,596 | B1 | 5/2002 | Wiser et al. |
| 6,427,140 | B1 | 7/2002 | Ginter et al. |

(Continued)

FOREIGN PATENT DOCUMENTS

AU 2006302090 4/2007
(Continued)

OTHER PUBLICATIONS

Non-Final Office Action of U.S. Appl. No. 11/249,123, Apr. 20, 2006 (mailing date), Farrugia, Augustin, et al.

(Continued)

*Primary Examiner* — Edan Orgad
*Assistant Examiner* — Bradley Holder
(74) *Attorney, Agent, or Firm* — Adeli & Tollen, LLP

(57) ABSTRACT

Some embodiments of the invention provide a content-distribution system for distributing content under a variety of different basis. For instance, in some embodiments, the content-distribution system distributes device-restricted content and device-unrestricted content. Device-restricted content is content that can only be played on devices that the system associates with the particular user. Device-unrestricted content is content that can be played on any device without any restrictions. However, for at least one operation or service other than playback, device-unrestricted content has to be authenticated before this operation or service can be performed on the content. In some embodiments, the system facilitates this authentication by specifying a verification parameter for a piece of device-unrestricted content. The content-distribution system of some embodiments has a set of servers that supply (1) media storage structures that store content, (2) cryptographic keys that are needed to decrypt device-restricted content, and (3) verification parameters that are needed to verify device-unrestricted content. In some embodiments, the device that receives the media storage structure inserts the received cryptographic key or verification parameter in the received media storage structure. In some embodiments, the set of servers also supply cryptographic content keys for the device-unrestricted content. These keys are used to decrypt the content upon arrival, upon first playback, or at some other time. However, some embodiments do not store these cryptographic keys in the media storage structures for the device-unrestricted content.

24 Claims, 13 Drawing Sheets

U.S. PATENT DOCUMENTS

| | | | |
|---|---|---|---|
| 6,507,727 B1 | 1/2003 | Henrick | |
| 6,772,340 B1 | 8/2004 | Peinado et al. | |
| 6,865,555 B2 | 3/2005 | Novak | |
| 6,886,098 B1 | 4/2005 | Benaloh | |
| 6,910,022 B2 | 6/2005 | Stefik et al. | |
| 6,948,070 B1 | 9/2005 | Ginter et al. | |
| 6,986,043 B2 | 1/2006 | Andrew et al. | |
| 6,986,046 B1 | 1/2006 | Tuvell et al. | |
| 6,993,137 B2 | 1/2006 | Fransdonk | |
| 6,999,587 B1 | 2/2006 | Asano et al. | |
| 7,007,170 B2 | 2/2006 | Morten | |
| 7,016,498 B2 | 3/2006 | Peinado et al. | |
| 7,017,188 B1 | 3/2006 | Schmeidler et al. | |
| 7,058,809 B2 | 6/2006 | White et al. | |
| 7,073,073 B1 | 7/2006 | Nonaka et al. | |
| 7,080,037 B2 | 7/2006 | Burger et al. | |
| 7,110,984 B1 | 9/2006 | Spagna et al. | |
| 7,124,302 B2 | 10/2006 | Ginter et al. | |
| 7,133,845 B1 | 11/2006 | Ginter et al. | |
| 7,170,999 B1 | 1/2007 | Kessler et al. | |
| 7,203,966 B2 | 4/2007 | Abburi et al. | |
| 7,213,005 B2 | 5/2007 | Mourad et al. | |
| 7,237,268 B2 | 6/2007 | Fields | |
| 7,254,837 B2 | 8/2007 | Fields | |
| 7,340,055 B2 | 3/2008 | Hori et al. | |
| 7,350,238 B2 | 3/2008 | Abe et al. | |
| 7,353,209 B1 | 4/2008 | Peinado et al. | |
| 7,389,273 B2 | 6/2008 | Irwin et al. | |
| 7,426,637 B2 | 9/2008 | Risan et al. | |
| 7,426,751 B2 | 9/2008 | Sako et al. | |
| 7,567,671 B2 | 7/2009 | Gupte | |
| 7,567,674 B2 | 7/2009 | Nishimoto et al. | |
| 7,570,761 B2 | 8/2009 | Risan et al. | |
| 7,570,762 B2 | 8/2009 | Kurihara et al. | |
| 7,747,876 B2 | 6/2010 | Oxford | |
| 7,757,077 B2 | 7/2010 | Peinado et al. | |
| RE41,657 E | 9/2010 | Saito | |
| 7,802,095 B2 | 9/2010 | Risan et al. | |
| 7,814,022 B2 | 10/2010 | Gupte | |
| 7,860,802 B2 | 12/2010 | Pandya et al. | |
| 7,870,385 B2 | 1/2011 | Risan et al. | |
| 7,940,935 B2 | 5/2011 | Nakahara et al. | |
| 8,005,757 B2 | 8/2011 | Peinado et al. | |
| 8,041,034 B2 | 10/2011 | Kim et al. | |
| 8,099,369 B2 | 1/2012 | Fahrny et al. | |
| 8,180,708 B2 | 5/2012 | Hurtado et al. | |
| 8,224,751 B2 | 7/2012 | Farrugia et al. | |
| 2001/0042043 A1 | 11/2001 | Shear et al. | |
| 2001/0053979 A1 | 12/2001 | Kori | |
| 2001/0054027 A1 | 12/2001 | Hasegawa | |
| 2002/0002674 A1* | 1/2002 | Grimes et al. | 713/156 |
| 2002/0006204 A1* | 1/2002 | England et al. | 380/269 |
| 2002/0007454 A1 | 1/2002 | Tarpenning et al. | |
| 2002/0019814 A1* | 2/2002 | Ganesan | 705/59 |
| 2002/0064280 A1 | 5/2002 | Gassho | |
| 2002/0138593 A1 | 9/2002 | Novak et al. | |
| 2003/0018582 A1 | 1/2003 | Yaacovi | |
| 2003/0056212 A1 | 3/2003 | Siegel et al. | |
| 2003/0078853 A1* | 4/2003 | Peinado et al. | 705/26 |
| 2003/0079038 A1 | 4/2003 | Robbin et al. | |
| 2003/0084306 A1 | 5/2003 | Abburi et al. | |
| 2003/0097379 A1 | 5/2003 | Ireton | |
| 2003/0131353 A1* | 7/2003 | Blom et al. | 725/25 |
| 2003/0161473 A1 | 8/2003 | Fransdonk | |
| 2003/0194092 A1* | 10/2003 | Parks et al. | 380/281 |
| 2003/0198349 A1 | 10/2003 | Aizu et al. | |
| 2003/0217011 A1* | 11/2003 | Peinado et al. | 705/59 |
| 2004/0003267 A1* | 1/2004 | Strom et al. | 713/193 |
| 2004/0003398 A1* | 1/2004 | Donian et al. | 725/34 |
| 2004/0024688 A1* | 2/2004 | Bi et al. | 705/37 |
| 2004/0032950 A1 | 2/2004 | Graunke | |
| 2004/0039932 A1 | 2/2004 | Elazar et al. | |
| 2004/0044779 A1* | 3/2004 | Lambert | 709/229 |
| 2004/0049694 A1* | 3/2004 | Candelore | 713/200 |
| 2004/0064416 A1 | 4/2004 | Peled et al. | |
| 2004/0086120 A1* | 5/2004 | Akins et al. | 380/240 |
| 2004/0103300 A1 | 5/2004 | Risan et al. | |
| 2004/0107356 A1 | 6/2004 | Shamoon et al. | |
| 2004/0111613 A1 | 6/2004 | Shen-Orr et al. | |
| 2004/0111631 A1 | 6/2004 | Kocher et al. | |
| 2004/0143760 A1 | 7/2004 | Alkove et al. | |
| 2004/0148523 A1* | 7/2004 | Lambert | 713/201 |
| 2004/0158712 A1* | 8/2004 | Lee et al. | 713/165 |
| 2004/0172533 A1 | 9/2004 | DeMello et al. | |
| 2004/0181490 A1* | 9/2004 | Gordon et al. | 705/59 |
| 2004/0181667 A1 | 9/2004 | Venters, III et al. | |
| 2004/0187014 A1* | 9/2004 | Molaro | 713/200 |
| 2004/0242224 A1 | 12/2004 | Janik et al. | |
| 2004/0242269 A1 | 12/2004 | Fadell | |
| 2004/0249768 A1 | 12/2004 | Kontio et al. | |
| 2005/0004875 A1* | 1/2005 | Kontio et al. | 705/52 |
| 2005/0027991 A1 | 2/2005 | DiFonzo | |
| 2005/0049931 A1* | 3/2005 | Wisnudel et al. | 705/26 |
| 2005/0050345 A1 | 3/2005 | Dowdy et al. | |
| 2005/0071274 A1* | 3/2005 | Pfaff et al. | 705/51 |
| 2005/0071744 A1 | 3/2005 | Dunbar et al. | |
| 2005/0086326 A1 | 4/2005 | Manning et al. | |
| 2005/0086501 A1* | 4/2005 | Woo et al. | 713/189 |
| 2005/0091173 A1 | 4/2005 | Alve | |
| 2005/0097063 A1 | 5/2005 | Benaloh | |
| 2005/0102513 A1 | 5/2005 | Alve | |
| 2005/0108361 A1* | 5/2005 | Scott et al. | 709/217 |
| 2005/0169467 A1 | 8/2005 | Risan et al. | |
| 2005/0182931 A1 | 8/2005 | Robert et al. | |
| 2005/0203853 A1* | 9/2005 | Yamamoto et al. | 705/59 |
| 2005/0203959 A1* | 9/2005 | Muller et al. | 707/104.1 |
| 2005/0210249 A1 | 9/2005 | Lee et al. | |
| 2005/0216763 A1* | 9/2005 | Lee et al. | 713/200 |
| 2005/0228988 A1 | 10/2005 | Traw et al. | |
| 2005/0268098 A1 | 12/2005 | Oh et al. | |
| 2005/0273629 A1* | 12/2005 | Abrams et al. | 713/189 |
| 2005/0278259 A1* | 12/2005 | Gunaseelan et al. | 705/59 |
| 2005/0283791 A1 | 12/2005 | McCarthy et al. | |
| 2005/0289076 A1* | 12/2005 | Lambert | 705/59 |
| 2006/0005257 A1* | 1/2006 | Tohru et al. | 726/27 |
| 2006/0010500 A1 | 1/2006 | Elazar et al. | |
| 2006/0015944 A1 | 1/2006 | Fields | |
| 2006/0015945 A1 | 1/2006 | Fields | |
| 2006/0020784 A1 | 1/2006 | Jonker et al. | |
| 2006/0021068 A1 | 1/2006 | Xu et al. | |
| 2006/0053079 A1 | 3/2006 | Edmonson et al. | |
| 2006/0059095 A1* | 3/2006 | Akins et al. | 705/51 |
| 2006/0059098 A1* | 3/2006 | Major et al. | 705/57 |
| 2006/0107285 A1* | 5/2006 | Medvinsky | 725/25 |
| 2006/0159303 A1 | 7/2006 | Davis et al. | |
| 2006/0236097 A1 | 10/2006 | Prologo et al. | |
| 2006/0282864 A1 | 12/2006 | Gupte | |
| 2007/0083473 A1 | 4/2007 | Farrugia et al. | |
| 2007/0198419 A1 | 8/2007 | Park et al. | |
| 2007/0208668 A1 | 9/2007 | Candelore | |
| 2007/0219917 A1 | 9/2007 | Liu et al. | |
| 2007/0260548 A1 | 11/2007 | Farrugia et al. | |
| 2007/0276760 A1 | 11/2007 | Kanehara et al. | |
| 2008/0256368 A1 | 10/2008 | Ross et al. | |
| 2009/0063871 A1 | 3/2009 | Frijters et al. | |

FOREIGN PATENT DOCUMENTS

| | | |
|---|---|---|
| AU | 2010201178 | 4/2010 |
| CA | 2476919 | 2/2006 |
| CA | 2625360 | 4/2007 |
| CA | 2715439 | 4/2007 |
| EP | 0614308 | 9/1994 |
| EP | 0715246 | 6/1996 |
| EP | 1085443 | 3/2001 |
| EP | 1189432 | 3/2002 |
| EP | 1465426 | 10/2004 |
| EP | 1521260 | 4/2005 |
| EP | 1777639 | 4/2007 |
| EP | 1777706 | 4/2007 |
| EP | 1852799 | 11/2007 |
| EP | 2065828 | 6/2009 |
| EP | 2315151 | 4/2011 |
| EP | 12157933 | 3/2012 |
| EP | 2466511 | 6/2012 |
| EP | 12175992 | 7/2012 |
| EP | 12175994 | 7/2012 |
| JP | 2001-160003 | 6/2001 |

| | | |
|---|---|---|
| JP | 2001-256196 | 9/2001 |
| JP | 2002-007733 | 1/2002 |
| JP | 2003-058660 | 2/2003 |
| JP | 2005-110215 | 4/2005 |
| JP | 2005-228347 | 8/2005 |
| WO | WO 9624209 | 8/1996 |
| WO | WO 0031964 | 6/2000 |
| WO | WO 02/03176 | 1/2002 |
| WO | WO 2004/008460 | 1/2004 |
| WO | WO 2004/070588 | 8/2004 |
| WO | WO 2004/097609 | 11/2004 |
| WO | WO 2005/093745 | 10/2005 |
| WO | WO 2005/106681 | 11/2005 |
| WO | WO 2005/116859 | 12/2005 |
| WO | WO 2006/101549 | 9/2006 |
| WO | WO 2007/044825 | 4/2007 |
| WO | PCT/US2008/061817 | 4/2008 |
| WO | WO 2008/048712 | 4/2008 |
| WO | WO 2008/147617 | 12/2008 |

OTHER PUBLICATIONS

Restriction Requirement of U.S. Appl. No. 11/249,123, Apr. 24, 2007 (mailing date), Farrugia, Augustin, et al.
Final Office Action of U.S. Appl. No. 11/249,123, Aug. 23, 2007 (mailing date), Farrugia, Augustin, et al.
Restriction Requirement of U.S. Appl. No. 11/249,123, May 1, 2008 (mailing date), Farrugia, Augustin, et al.
European Search Report for EP06291581.4, Jan. 31, 2007 (mailing date), Apple Computer, Inc.
International Search Report and Written Opinion for PCT/US2006/039778, Jan. 22, 2008 (mailing date), Apple Inc.
International Search Report and Written Opinion for PCT/US2007/068081, May 7, 2008 (mailing date), Apple Inc.
International Search Report and Written Opinion for PCT/US2008/061817, Sep. 1, 2008 (mailing date), Apple Inc.
Gong, L., et al: "Going beyond the sandbox: An overview of the new security architecture in the Java <TM> Development Kit 1.2." Proceedings of the USENIX Symposium on Internet Technologies and Systems, Dec. 8, 1997, pp. 103-112.
Non-Final Office Action of U.S. Appl. No. 11/381,486, Dec. 24, 2008 (mailing date), Farrugia, Augustin, et al.
Non-Final Office Action of U.S. Appl. No. 11/249,123, Sep. 25, 2008 (mailing date), Farrugia, Augustin, et al.
International Preliminary Report on Patentability for PCT/US2007/068081, Nov. 13, 2008 (mailing date), Apple Inc.
Partial European Search Report for EP 08251614, Apr. 7, 2009 (mailing date), Apple Inc.
Final Office Action of U.S. Appl. No. 11/249,123, Mar. 19, 2009 (mailing date), Farrugia, Augustin, et al.
Non-Final Office Action of U.S. Appl. No. 11/249,123, Oct. 2, 2009 (mailing date), Farrugia, Augustin, et al.
Restriction Requirement of U.S. Appl. No. 11/381,486, Jul. 8, 2009 (mailing date), Farrugia, Augustin, et al.
Final Office Action of U.S. Appl. No. 11/381,486, Nov. 3, 2009 (mailing date), Farrugia, Augustin, et al.
Extended European Search Report for EP 08251614.7, Jul. 14, 2009 (mailing date), Apple Inc.
International Preliminary Report on Patentability for PCT/US2006/039778, Mar. 17, 2009 (mailing date), Apple Inc.
Updated portions of prosecution history of U.S. Appl. No. 11/381,486, Jul. 7, 2010, Farrugia, Augustin J., et al.
Updated portions of prosecution history of U.S. Appl. No. 11/249,123, Jul. 22, 2010, Farrugia, Augustin J., et al.
EP search report for EP07107470.2, Jul. 28, 2010 (mailing date), Apple Inc.
EP Office Action of EP06291581.4, Jul. 12, 2010 (mailing date), Apple Inc.
International Preliminary Report on Patentability and Written Opinion for PCT/US2008/061817, Nov. 24, 2009 (issuance date), Apple Inc.
Updated portions of prosecution history of U.S. Appl. No. 11/381,486, Apr. 28, 2011, Farrugia, Augustin J., et al.
Updated portions of prosecution history of U.S. Appl. No. 11/249,123, Jun. 21, 2011, Farrugia, Augustin J., et al.
Examination Report for AU2006302090, Dec. 7, 2010, Apple Inc.
Examination Report for AU2006302090, Jun. 7, 2011, Apple Inc.
Examination Report for AU2010201178, Jun. 7, 2011, Apple Inc.
Examination Report for CA20062715439, Jan. 20, 2011, Apple Inc.
Updated portions of prosecution history of EP07107470, Apr. 19, 2011, Apple Inc.
Updated portions of prosecution history of EP06291581, Dec. 16, 2010, Apple Inc.
Updated portions of prosecution history of EP08251614, Aug. 10, 2010, Apple Inc.
U.S. Appl. No. 13/474,697, filed May 17, 2012, Farrugia, Augustin J., et al.
Updated portions of prosecution history of U.S. Appl. No. 11/381,486, Jun. 13, 2012, Farrugia, Augustin J., et al.
Updated portions of prosecution history of U.S. Appl. No. 11/249,123, Jun. 21, 2012, Farrugia, Augustin J., et al.
Updated portions of prosecution history of AU2006302090, Jul. 5, 2012 (mailing date), Apple Inc.
Updated portions of prosecution history of AU2010201178, Jul. 5, 2012 (mailing date), Apple Inc.
Updated portions of prosecution history of EP06291581, Jul. 23, 2012 (mailing date), Apple Inc.
Updated portions of prosecution history of CA20062715439, May 2, 2012 (mailing date), Apple Inc.
Updated portions of prosecution history of EP08251614, Feb. 9, 2012 (mailing date), Apple Inc.
Portions of prosecution history of EP12157933, Jun. 26, 2012 (date of completion), Apple Inc.
Portions of prosecution history of EP12157936, May 21, 2012 (mailing date), Apple Inc.
Rosenblatt, Bill, "Rights Information Management," http://www.giantstepsmts.com, Sep. 21, 2006, pp. 1-12, GiantSteps Media Technology Strategies, New York, New York, USA.
Updated portions of prosecution history of U.S. Appl. No. 11/381,486, Jan. 9, 2012, Farrugia, Augustin J., et al.
Updated portions of prosecution history of AU2006302090, Nov. 1, 2011, Apple Inc.
Updated portions of prosecution history of AU2010201178, Sep. 1, 2011, Apple Inc.
Updated portions of prosecution history of EP07107470, Nov. 14, 2011, Apple Inc.
Updated portions of prosecution history of EP06291581, Jan. 12, 2012, Apple Inc.
Portions of prosecution history of EP10196353, Nov. 30, 2011, Apple Inc.
Updated portions of prosecution history of EP08251614, Oct. 10, 2011, Apple Inc.
Mori, Ryoichi, et al., "Superdistribution: The Concept and the Architecture," Transactions of the Institute of Electronics, Information and Communication Engineers, Jul. 1990, pp. 1133-1146., vol. E73, No. 7, Tokyo, JP.
Updated portions of prosecution history of AU2006302090, May 6, 2011 (mailing date), Apple Inc.
Updated portions of prosecution history of AU2010201178, Aug. 8, 2011 (mailing date), Apple Inc.
Updated portions of prosecution history of CA20062625360, Sep. 10, 2010 (mailing date), Apple Inc.
Updated portions of prosecution history of CA20062715439, Aug. 25, 2011 (mailing date), Apple Inc.
Updated portions of prosecution history of U.S. Appl. No. 11/381,486, Jul. 27, 2011, Farrugia, Augustin J., et al.
Updated portions of prosecution history of U.S. Appl. No. 11/249,123, Aug. 5, 2011, Farrugia, Augustin J., et al.

* cited by examiner

MEDIA STORAGE STRUCTURES FOR STORING CONTENT, DEVICES FOR USING SUCH STRUCTURES, SYSTEMS FOR DISTRIBUTING SUCH STRUCTURES

FIELD OF THE INVENTION

The present invention relates to media storage structures for storing content, devices for using such structures, and systems for distributing such structures.

BACKGROUND OF THE INVENTION

The protection of digital content transferred between computers over a network is fundamentally important for many enterprises today. Enterprises attempt to secure this protection by implementing some form of Digital Rights Management (DRM) process. The DRM process often involves encrypting the piece of content (e.g., encrypting the binary form of the content) to restrict usage to those who have been granted a right to the content.

Cryptography is the traditional method of protecting data in transit across a network. In its typical application, cryptography protects communications between two mutually trusting parties from an attack on the data in transit. However, for many digital file transfer applications today (e.g., for the transfer of audio or video content), the paradigm has shifted, as a party that receives the content (i.e., the "receiving party") might try to break the DRM encryption that the party that supplied the content (i.e., the "distributing party") applied to the content. In addition, with the proliferation of network penetration attacks, a third party may obtain access to the receiving party's computer and thus to the protected content.

Some pieces of content that are distributed in existing DRM systems are related to one another. However, existing DRM systems often do not allow content recipients to flexibly purchase or license a subset of the contents from a related set of DRM contents. For instance, one existing DRM system distributes certain songs along with their associated music videos. In distributing a song along with its associated music video, this DRM system rigidly requires a recipient either (1) to purchase both the song and its associated music video, or (2) to forego access to both the song and its associated music video. Therefore, there is a need in the art for a DRM system that flexibly allows content recipients to purchase or license a subset of the content from a related set of DRM contents.

Existing DRM systems typically distribute content under only one set of digital right management criteria. However, different content providers have started providing content under different basis. Accordingly, there is a need for a content distribution system that can flexibly distribute content according to different sets of digital rights criteria.

SUMMARY OF THE INVENTION

Some embodiments of the invention provide a content-distribution system for distributing content under a variety of different basis. For instance, in some embodiments, the content-distribution system can distribute at least two types of content to a particular user. The first type of content is device-restricted content, while the second type of content is device-unrestricted content.

Device-restricted content is content that can only be played on devices that the system associates with the particular user. Device-unrestricted content is content that can be played on any device without any restrictions. However, for at least one operation or service other than playback, device-unrestricted content has to be authenticated before this operation or service can be performed on the content. In some embodiments, the system facilitates this authentication by specifying a verification parameter for a piece of device-unrestricted content.

The content-distribution system of some embodiments has a set of servers that supply (1) media storage structures that store content, (2) cryptographic keys (also called content keys below) that are needed to decrypt device-restricted content, and (3) verification parameters that are needed to verify device-unrestricted content. In some embodiments, the device (e.g., computer, portable player, etc.) that receives the media storage structure inserts the received cryptographic key or verification parameter in the received media storage structure.

In some embodiments, the set of servers also supply cryptographic content keys for the device-unrestricted content. These keys are used to decrypt the content upon arrival, upon first playback, or at some other time. However, some embodiments do not store these cryptographic keys in the media storage structures for the device-unrestricted content.

In some embodiments, the system supplies the cryptographic keys and verification parameters from a different set of servers than the set of servers that supply the media storage structures that contain the content. Also, in some embodiments, a media storage structure might include multiple pieces of related content (e.g., multiple pieces of related video, audio, text, sound, etc.). In some embodiments, two pieces of content are related when they relate to the same audio and/or video presentation (e.g., song, movie, music video, etc.). In some cases, two pieces of related content can be viewed or played simultaneously. In other cases, two pieces of related content can be viewed or played independently.

For each piece of content in a media storage structure with several related pieces of content, the content-distribution system of some embodiments provides a cryptographic key and/or a verification parameter. In some embodiments, each such cryptographic key is stored in the media storage structure in case of the device-restricted content, while each verification parameter is stored in the media storage structure in case of the device-unrestricted content.

In some embodiments, the device (e.g., the computer) that receives the media storage structure transfers the media storage structure to another device (e.g., to a portable player). In this transfer, one of the pieces of content from the media storage structure might be removed in the transfer of the media storage structure to the other device (e.g., in the portable player). In some cases, content is removed from the media storage structure in order to reduce the consumption of resources on the other device. In other cases, content is removed from the media storage structure because the other device does not have rights to access this other content. In removing the piece or pieces of content, some embodiments also remove the content key or verification parameter associated with this content.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

Figure 1:
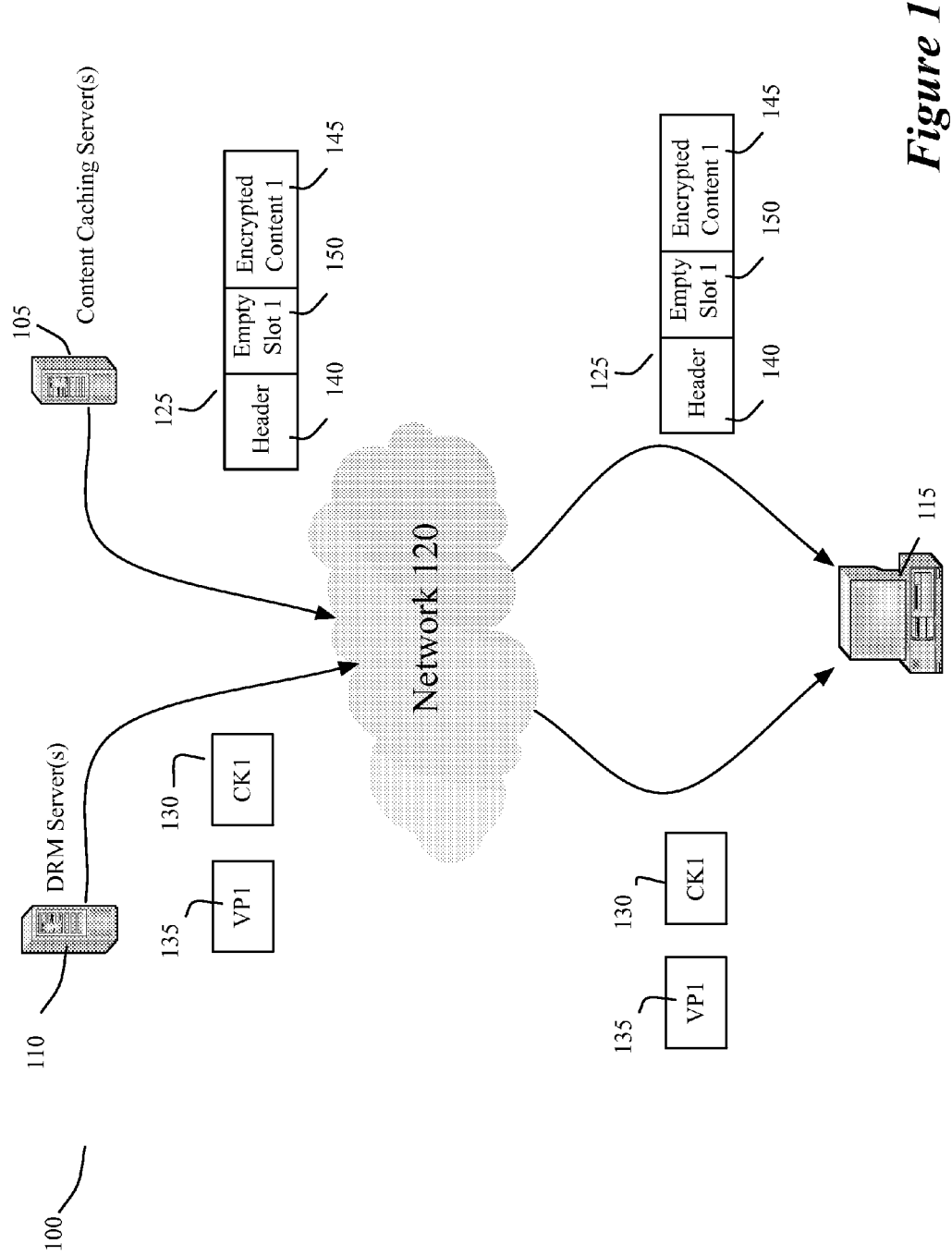
FIG. 1 illustrates an example of distributing device-unrestricted content with associated verification parameter.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a content-distribution system for distributing content under a variety of different basis. For instance, in some embodiments, the content-distribution system can distribute at least two types of content to a particular user. The first type of content is device-restricted content, while the second type of content is device-unrestricted content.

Device-restricted content is content that can only be played on devices that the system associates with the particular user. Device-unrestricted content is content that can be played on any device without any restrictions. However, for at least one operation or service other than playback, device-unrestricted content has to be authenticated before this operation or service can be performed on the content. In some embodiments, the system facilitates this authentication by specifying a verification parameter for a piece of device-unrestricted content.

The content-distribution system of some embodiments has a set of servers that supply (1) media storage structures that store content, (2) cryptographic keys (also called content keys below) that are needed to decrypt device-restricted content, and (3) verification parameters that are needed to verify device-unrestricted content. In some embodiments, the device (e.g., computer, portable player, etc.) that receives the media storage structure inserts the received cryptographic key or verification parameter in the received media storage structure.

In some embodiments, the set of servers also supply cryptographic content keys for the device-unrestricted content. These keys are used to decrypt the content upon arrival, upon first playback, or at some other time. However, some embodiments do not store these cryptographic keys in the media storage structures for the device-unrestricted content.

In some embodiments, the system supplies the cryptographic keys and verification parameters from a different set of servers than the set of servers that supply the media storage structures that contain the content. Also, in some embodiments, a media storage structure might include multiple pieces of related content (e.g., multiple pieces of related video, audio, text, sound, etc.). In some embodiments, two pieces of content are related when they relate to the same presentation, such as the same audio and/or video presentation (e.g., song, movie, music video, etc.). In some cases, two pieces of related content can be viewed or played simultaneously. In other cases, two pieces of related content can be viewed or played independently.

For each piece of content in a media storage structure with several related pieces of content, the content-distribution system of some embodiments provides a cryptographic key and/or a verification parameter. In some embodiments, each such cryptographic key is stored in the media storage structure in case of the device-restricted content, while each verification parameter is stored in the media storage structure in case of the device-unrestricted content.

While this application describes receiving, storing, manipulating and using a "key," it will be understood that a host of known techniques can be used to disguise the key. For example, key hiding, key encryption, key splitting (e.g., splitting a key into more than one piece to be stored separately), and obfuscation of read/write operations can all be used and are considered within the general concept of receiving, storing, and using a "key."

Moreover, different embodiments use different types of media storage structures. In several embodiments described below, the media storage structures are media files. One of ordinary skill will realize that other embodiments will use different types of media storage structures.

FIGS. 1-6B illustrate several different examples of different types of content that the content-distribution system of some embodiments can distribute. These different examples are described below in Section I. Section II then describes one flow for distributing content in the content-distribution system of some embodiments. Section III describes the content storage library and device synchronization operation of some embodiments. Section IV then describes authentication operations for device-unrestricted content. Section V describes the encryption processes of some embodiments of the invention. Section VI then describes a conceptual overview of the hardware components of some of the devices in the content-distribution system of some embodiments.

I. Content-Distribution System

FIG. 1 illustrates a content-distribution system 100 of some embodiments. This content-distribution system distributes content in a manner that can be used to verify the authenticity of the source of the content. As shown in FIG. 1, the content-distribution system 100 includes a set of one or more content-caching servers 105, a set of one or more DRM servers 110, and a content-receiving computer 115. The computer 115 connects to the servers 105 and 110 through a communication network 120, such as a local area network, a wide area network, a network of networks (e.g., the Internet), etc.

Through this connection, the computer 115 communicates with the DRM server set 110 to obtain content. In some embodiments, the content-distribution system 100 does not entail the sale or licensing of content. Accordingly, in these embodiments, the DRM server set 110 simply enforces the distribution of content to authorized devices without considering any financial objectives.

For purposes of illustration, however, several embodiments of the content-distribution system 100 that are described below are involved in the sale or licensing of the content. Accordingly, in these embodiments, the DRM server set 110 is the server set from which the user of the computer 115 can purchase or license content. In other words, the DRM server set 110 of some embodiments is the server set that handles the financial transaction for purchasing or licensing content. In some instances, certain content can be purchased or licensed free.

After the DRM server set 110 determines that the computer 115 can obtain the content, the content-distribution system 100 uses the content caching server set 105 to provide a media file 125 to the computer 115 through the network 120. In some embodiments, the system 100 uses multiple caching servers 105 to cache content at various locations on the network, in order to improve the speed and efficiency of downloading content across the network.

In the example illustrated in FIG. 1, the media file 125 contains (1) a header 140, (2) one piece of encrypted content 145, and (3) an empty slot 150. The header includes metadata regarding the content in the media file. The empty slot 150 is for inserting a verification parameter in the media file 125.

Figure 2:
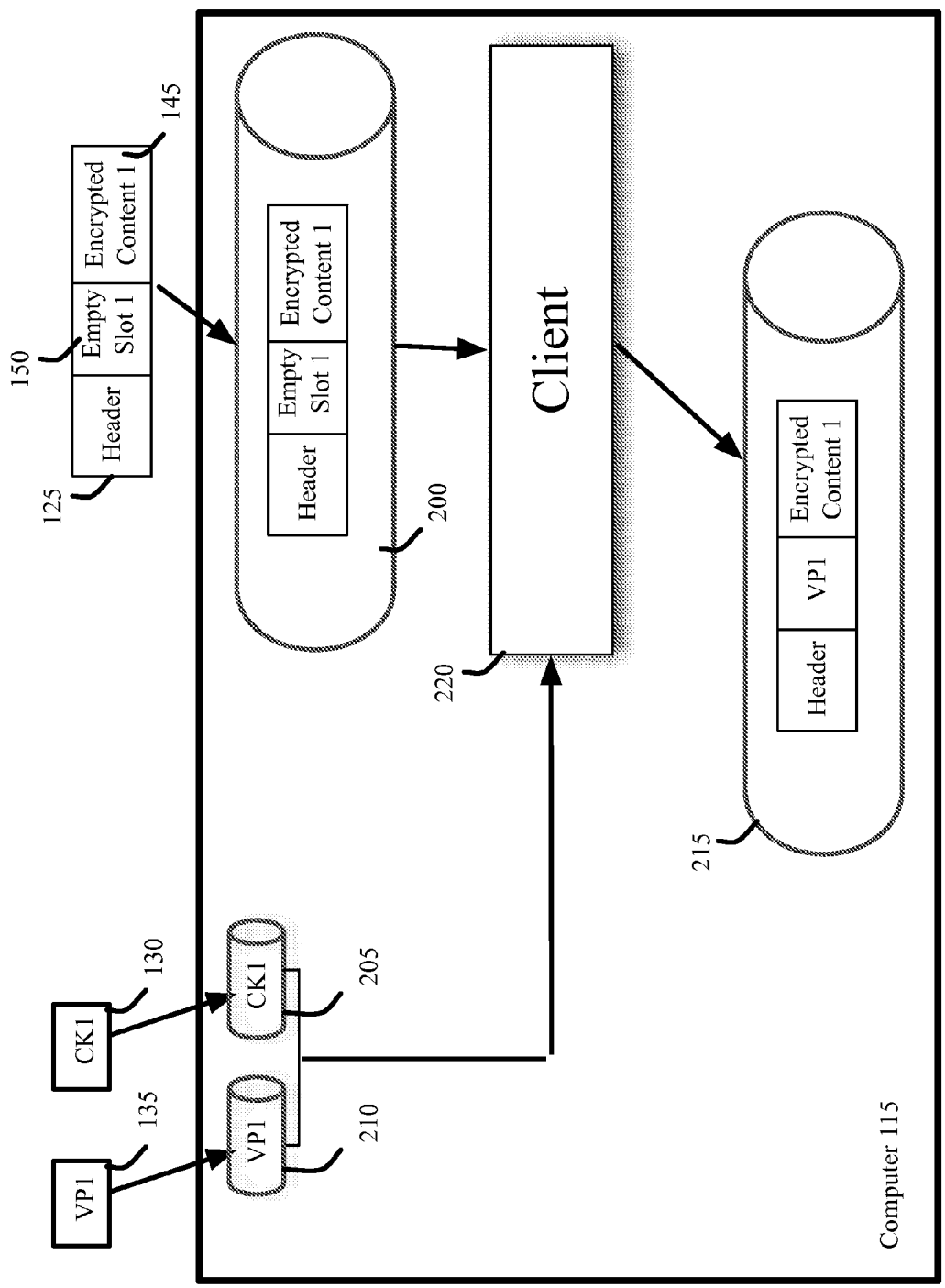
FIG. 2 illustrates a computer receiving the content and verification parameter distributed in FIG. 1.

For the encrypted content piece 145 in the media storage file 125, the DRM server set 110 provides (1) a cryptographic content key 130 for decrypting the encrypted content and (2) a verification parameter 135 for verifying the authenticity of the content. Specifically, as shown in FIG. 2, the computer 115 stores the media file 125, the content key 130, and the verification parameter 135 in temporary storages 200, 205, and 210 respectively. A client application 220 of the computer then uses the received content key 130 to decrypt the encrypted content piece 145. This client application then stores the verification parameter 135 in the empty slot 150 of the media file 125. The client application 220 then stores the media file 125 after the merging of the verification parameter in a content library storage 215.

The devices that can access the content 145 use the verification parameter 135 to authenticate the content. As further described below by reference to FIG. 11, the devices of some embodiments can also use the verification parameter of a particular piece of content to control whether certain operation or services can be provided for the particular piece of content.

In some embodiments, the verification parameter is signed by the content-distribution source (e.g., a DRM server 110) so that its content can be safely considered unaltered. In addition, the verification parameter stores different data in different embodiments of the invention. Accordingly, this parameter is used to authenticate the content 145 differently in different embodiments. For instance, in some embodiments, the verification parameter contains the identity of the distribution source of the content. In some of these embodiments, this identity is cryptographically protected (e.g., is encrypted) in the verification parameter. The devices in some such embodiments can then use the verification parameter to identify the content's source in order to determine whether the content 145 has been obtained from the appropriate distribution source.

The verification parameter of other embodiments does not identify the distribution source but provides other indicia that can be used to authenticate that the content has been provided by the appropriate distribution source. For example, in some embodiments, a particular content's verification parameter provides a complete or partial hash signature of the content (i.e., a signature that is generated by generating a hash of the entire content or of one or more parts of the content). This hash signature can later be verified through a symmetric or asymmetric hash verification process. U.S. patent application Ser. No. 11/377,082 describes one such hash generation and verification process, and is incorporated herein by reference. Instead of the hash signature, other embodiments might use the hash digest. In yet other embodiments, the verification parameter is cryptographically associated with its corresponding content piece through other mechanisms.

Figure 3:
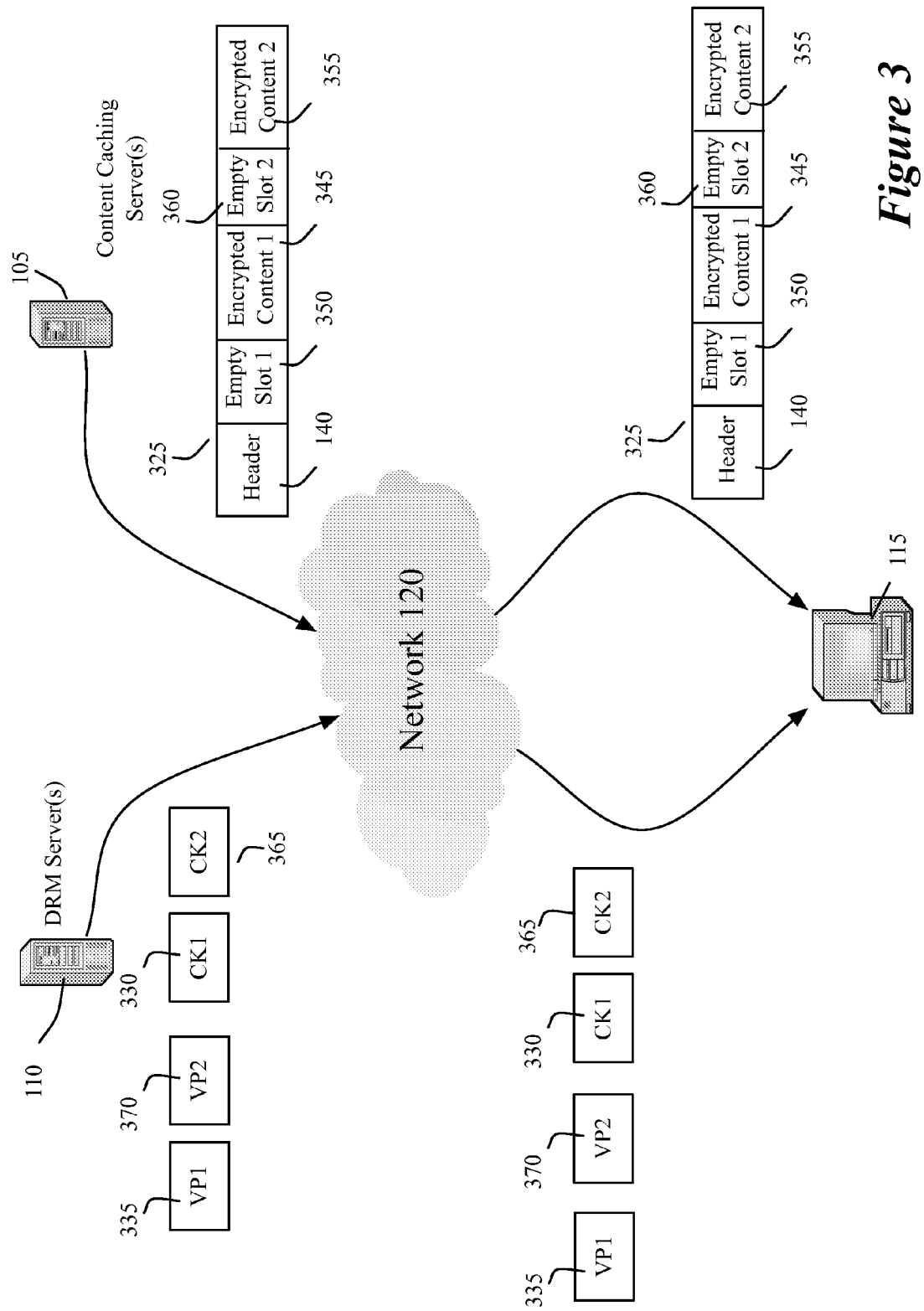
FIG. 3 illustrates another example of distributing device-unrestricted content with associated verification parameters.

The DRM server set 110 of some embodiments distributes only one verification parameter for multiple pieces of content in a media file. However, in several embodiments described above and below, the DRM server set 110 distributes multiple verification parameters for multiple pieces of content that are in a media file. FIG. 3 illustrates one such example. This example is similar to the example illustrated in FIG. 1, except that in FIG. 3 the system distributes two pieces of content and two verification parameters instead of one piece of content and one verification parameter. Specifically, in FIG. 3, the content server set 105 distributes a media file 325 with two pieces of encrypted content 345 and 355, two empty slots 350 and 360, and a file header 140. For each content piece in the media file, the DRM server set distributes a verification parameter and a content key. Accordingly, in the example illustrated in FIG. 3, the DRM server set 110 provides verification parameter 335 and content key 330 for the encrypted content piece 345, while it provides verification parameter 370 and content key 365 for the encrypted content piece 355.

Figure 4:
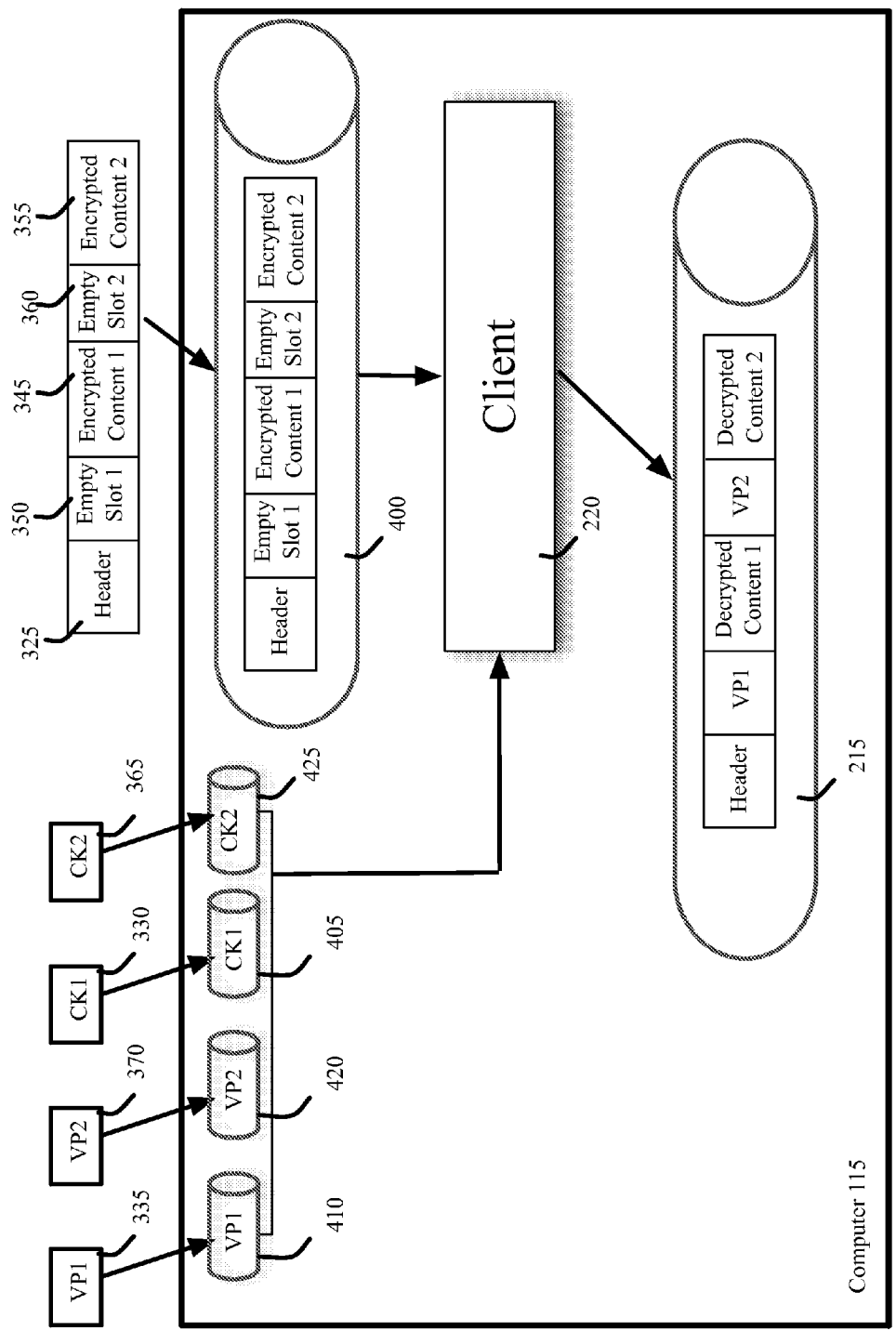
FIG. 4 illustrates a computer receiving the content and verification parameter distributed in FIG. 3.

As shown in FIG. 4, the computer 115 initially stores the media file 325, the verification parameters 335 and 370, and the content keys 330 and 365 in temporary storages 400, 410, 420, 405 and 425 respectively. The client application 220 then uses the content keys 405 and 425 to decrypt their corresponding pieces of content 345 and 355. This application then stores the verification parameters 335 and 370 in empty slots 350 and 360 of the media file 325, which it stores in the content library 215.

Figure 5:
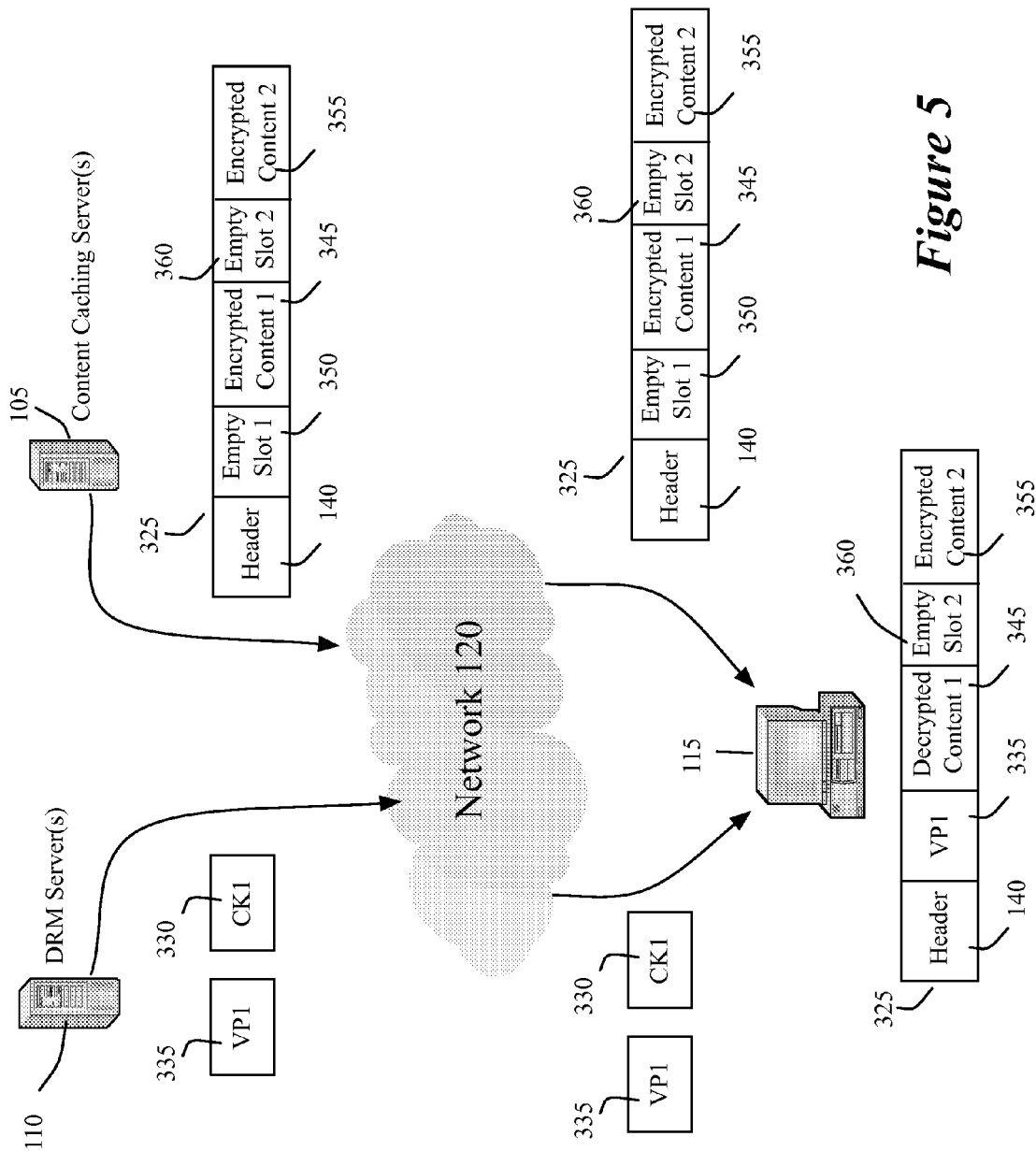
FIG. 5 illustrates yet another example of distributing device-unrestricted content with associated verification parameter.

FIG. 5 illustrates another example of content distribution by the content-distribution system 100. This example is similar to the example illustrated in FIG. 3, except that in FIG. 5 the system only distributes the verification parameter 335 and content key 330 for the first content piece 345 in the media file 325. The system might distribute only these values for the first content piece 345, because the user of the computer 115 might not have purchased the right to access the second content piece 355. Accordingly, in the example illustrated in FIG. 5, the computer 115 only decrypts the first content piece 345 and stores the verification parameter 335 in the media file 325. The computer 115 does not decrypt the second content piece 355 as it does not have this piece's associated content key. Hence, it cannot access the second content piece 355. It also does not store a verification parameter for the content piece 355 as it never received this from the DRM server set 110.

As mentioned above, the content-distribution system of some embodiments can distribute device-restricted and device-unrestricted content to a user. Device-restricted content is content that can be played only on devices that the system associates with the particular user. Device-unrestricted content is content that can be played on any device, but for at least one operation or service other than playback this content has to be authenticated before performing the operation and/or service.

Figure 6A:
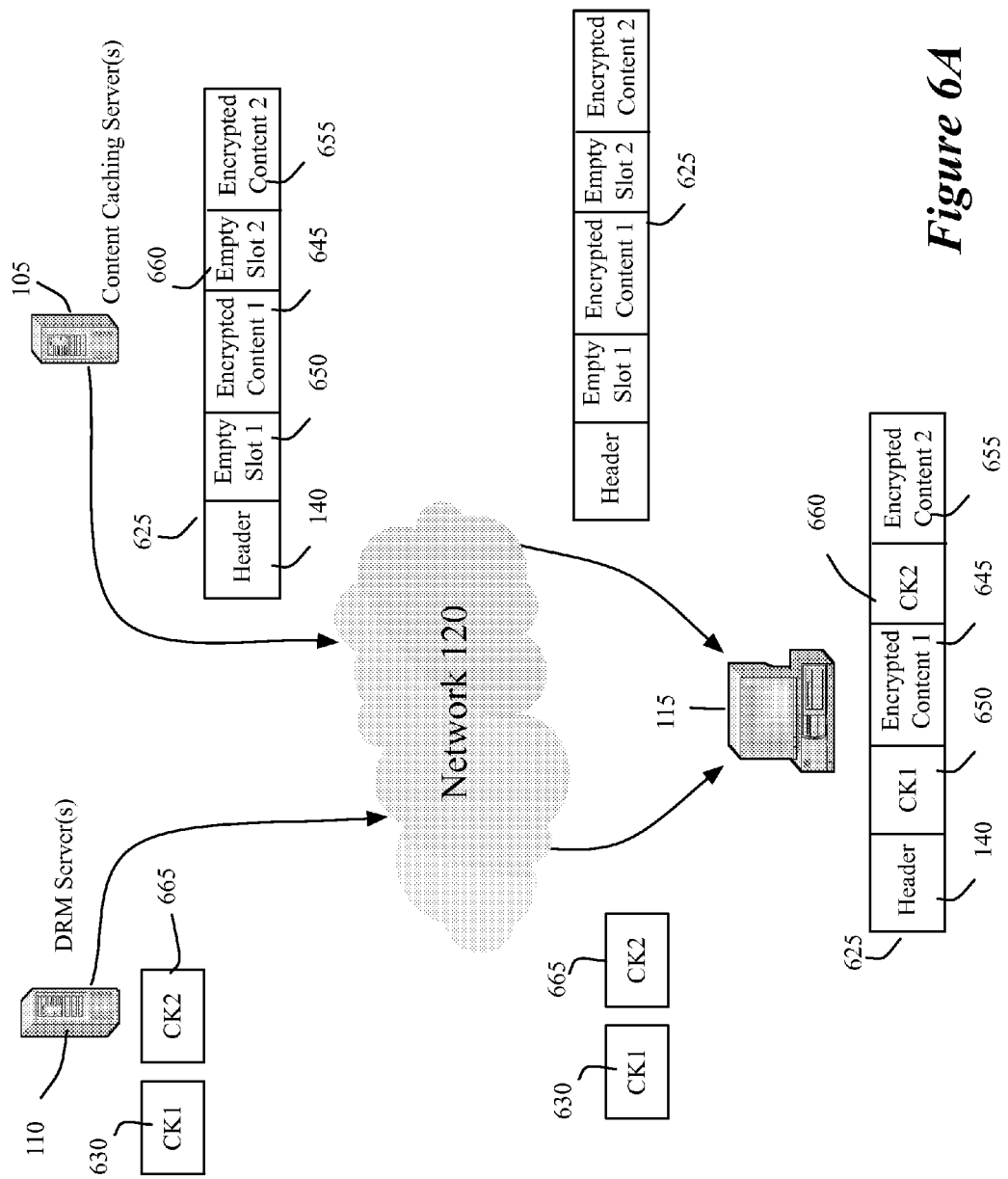
FIGS. 6A and 6B illustrate an example of distributing device-restricted content.
Figure 6B:
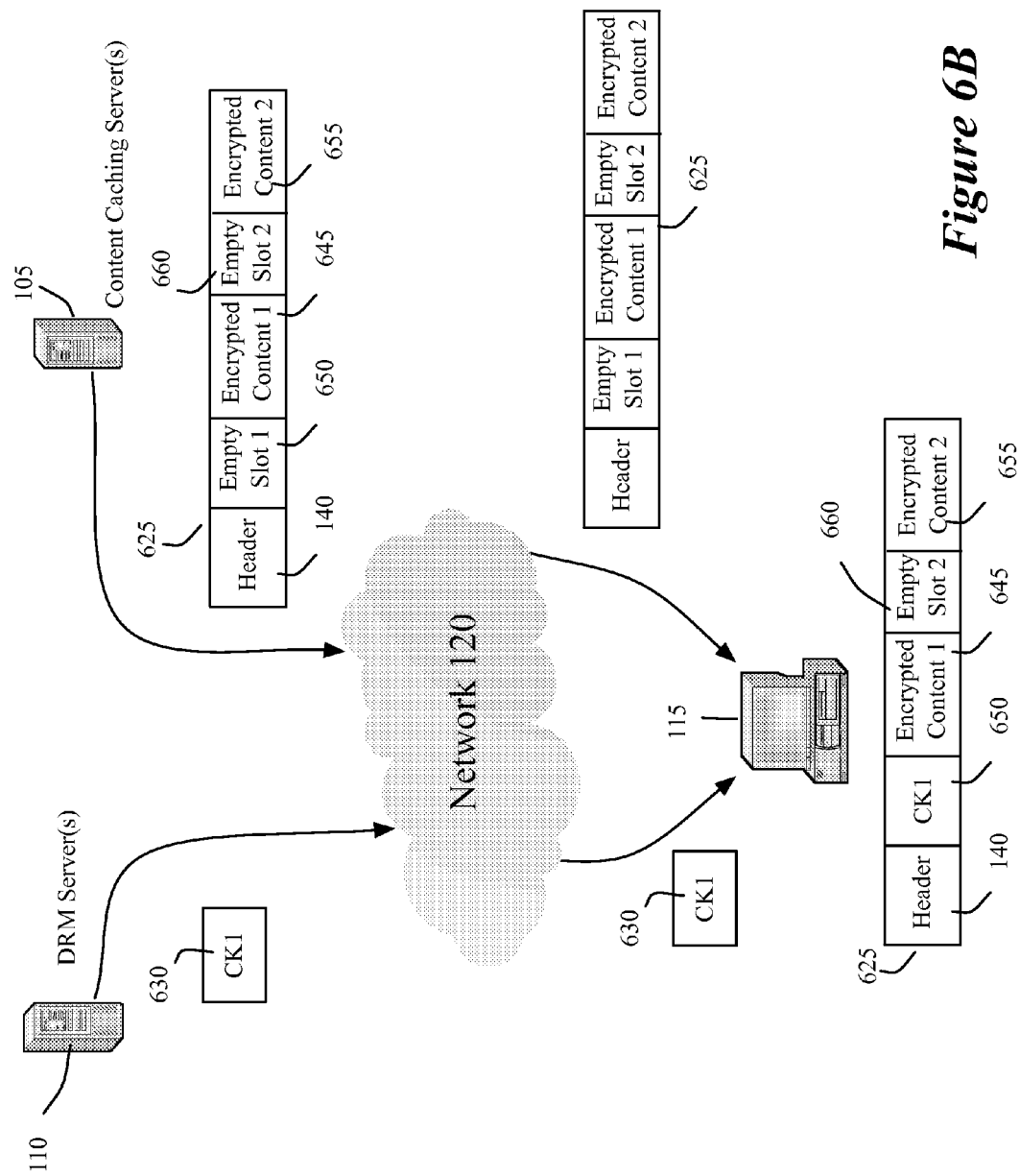

FIGS. 1-5 provided several examples of distributing the device-unrestricted content. FIGS. 6A and 6B illustrate two examples of distributing the device-restricted content. Specifically, FIG. 6A illustrates the content caching server set 105 providing to the computer 115 a media file 625 that has two pieces of encrypted content 645 and 655, two empty slots 650 and 660, and a file header 140. It also illustrates the DRM server set 110 providing to the computer 115 two cryptographic keys, where content key 630 is for decrypting content piece 645 and content key 665 is for decrypting content piece 655. Finally, FIG. 6A illustrates the media file 625 after the computer has inserted content keys 630 and 665 respectively into slots 650 and 660. Once inserted, these content keys can be used to decrypt the content pieces 645 and 655 of the media file 625 whenever the computer 115 needs to access the content. The insertion and use of such cryptographic keys in a media file are further described in Published U.S. Patent Application 2007/0083473, which is incorporated herein by reference.

In the example illustrated in FIG. 6A, the rights to access both pieces of content 645 and 655 have been purchased. Accordingly, in this example, the DRM server 110 sends a set of keys that would allow the computer 115 to access both pieces of content in the media file 625. FIG. 6B illustrates another example where only the right to access one of the content pieces in the media file 625 has been acquired. In this example, only the right to the first encrypted content 645 has been acquired. Accordingly, even though the caching server set 105 supplies the computer 115 with the media file that contains both pieces of content, the DRM server set 110 only supplies the content key 630 for the encrypted content 645. Accordingly, in this example, the computer only stores the received content key 630 in the media file 625. Hence, it can only access the encrypted content 645 in the media file by using the content key 630. Since the computer 115 has not received the encrypted content for the encrypted content 655 in the media file 625, the computer cannot decrypt the encrypted content 655.

In the examples described above, the content-distribution system 100 utilizes two different sets of computers to provide content and to provide keys/verification parameters. One of ordinary skill will realize that in other embodiments the content-distribution system utilizes the same set of computers to provide encrypted content, keys, and verification parameters.

In the examples described above, the content-distribution system 100 utilizes one set of DRM computers to provide keys and verification parameters. However, in some embodiments, the content-distribution system uses more than one set of computers to provide cryptographic keys and verification parameters for the content. For example, keys and parameters might come from different computers. Keys for audio content may also be available from one server set while keys for related video content stored in the same media storage structure may be available from another server set. The various servers may even be owned and administered by different parties, as may be the rights they administer.

Although some embodiments have been described with reference to a simplified network configuration, it will be understood that many variations exist within the framework described in this document. For example, the DRM server may be a single computer, or may be a server that is formed by many interconnected computers, memory and/or interconnecting pieces of equipment. Similarly, the content caching server could be a single computer or a collection of networked computers and memory all forming a server. Additionally, while content may be supplied from a content caching server directly or indirectly to a specific client computer, other transfer methods may result in a computer requiring keys to unlock content available to it from a peer computer, portable storage device, or some other transfer mechanism.

II. Overall Flow of Some Embodiments

Figure 7:
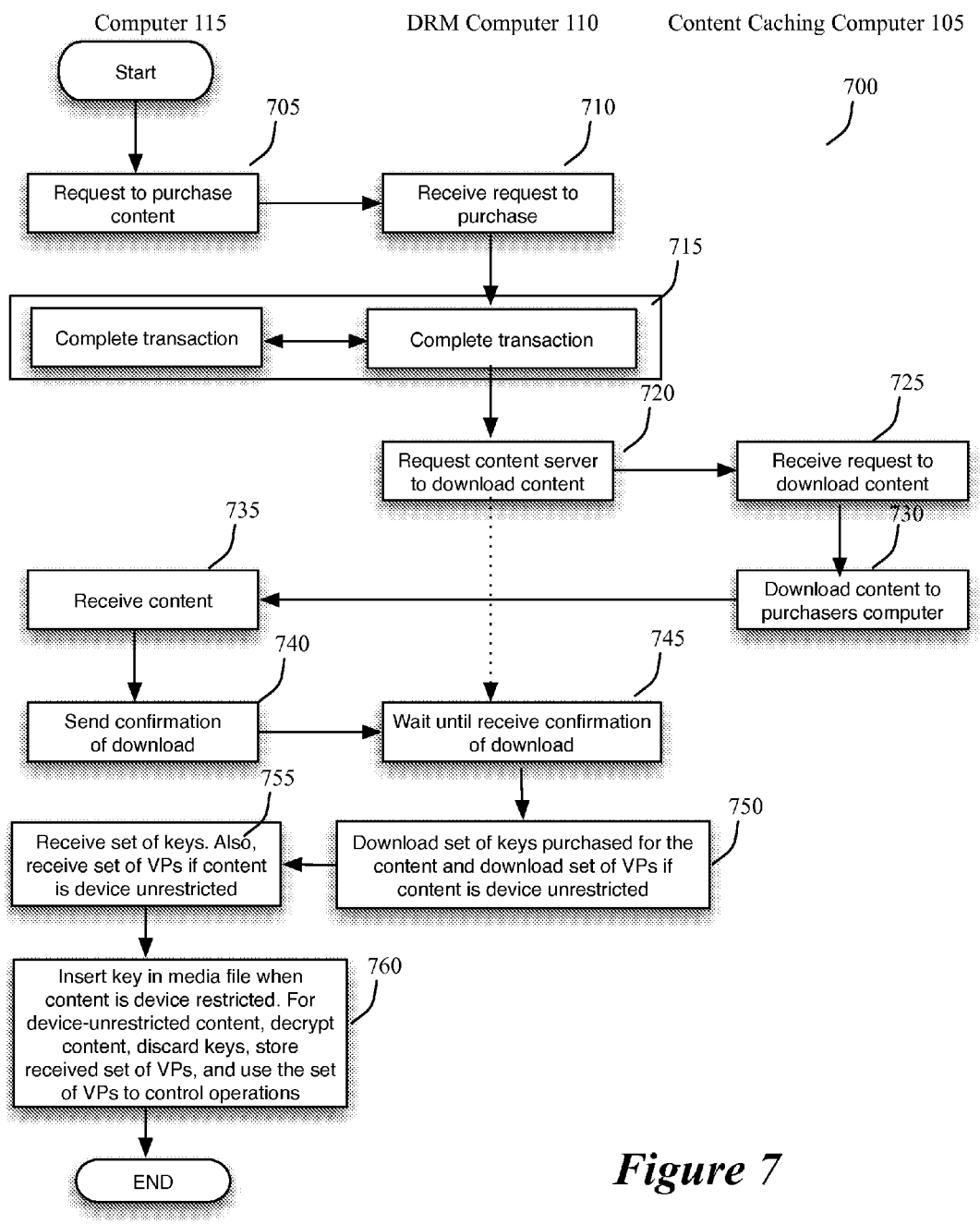
FIG. 7 conceptually illustrates a flow of operations of some embodiments of the invention.

FIG. 7 conceptually illustrates an example of one possible set of interactions between the computer 115, the DRM server set 110, and the content-caching server set 105. This set of interactions represents a content-acquisition process 700 of some embodiments of the invention. As shown in this figure, the acquisition process 700 starts when the computer 115 sends (at 705) a request to the DRM server set 110 to purchase or license one or more pieces of content that are stored in a particular media file. At 710, the DRM server set receives this request.

The acquisition process then has the DRM server set 110 and/or purchasing computer 115 perform one or more operations (at 715) to complete the purchase or license transaction. After the transaction has been completed, the DRM server set 110 sends (at 720) a request to the content-caching server set 105 to send the media file for the purchased or licensed content to the computer 115.

The caching server set 105 receives this request at 725, and in response, commences (at 730) a download of the media file to the purchasing computer 115. Examples of such a media file include media files 125, 325, and 625, which were described above by references to FIGS. 1-6B.

The computer 115 receives (at 735) the media file provided by the caching server set. The computer 115 then sends (at 740) a confirmation of the download to the DRM server set 110. After 740, the DRM server set 110 transitions to a wait state 745 to wait for the confirmation to be received from the computer 115.

Once the DRM server set 110 receives the confirmation of the download at 745, it sends (at 750) to the computer 115 a set of content keys and possibly a set of verification parameters for the media file that the computer 115 receives at 735. Specifically, for each piece of content in the received media file, the DRM server set 110 provides a content key and possibly a verification parameter in case of device-unrestricted content (i.e., in case the media file's content can be played on any device so long as for at least one operation or service other than playback it is authenticated before the operation or service). Various different examples of providing different sets of keys and verification parameters were discussed above by reference to FIGS. 1-6B.

As shown in FIG. 7, the computer 115 receives (at 755) the set of keys supplied by the DRM server set 110. When the acquired content is device-unrestricted, the computer also receives (at 755) a set of verification parameters that are supplied (at 750) by the DRM server set 110. As shown in FIG. 7, the computer 115 stores (at 760) the received set of keys in the media file when the acquired content is device-restricted content. FIGS. 6A and 6B illustrated examples of inserting such keys in the media file.

When the acquired content is device-unrestricted, the computer 115 (at 760) uses each received content key to decrypt its associated content piece in the received media file and then discards this key. At 760, the computer stores each received verification parameter in the received media file. FIGS. 1-5 provided several examples of the decryption and insertion operations at 760 for the device-unrestricted content. As further described below, the inserted verification parameters can be used to authenticate the content in the media file before certain operations or services are performed.

FIG. 7 illustrates one possible set of interactions between the computer 115, the DRM server set 110, and the caching server set 105. One of ordinary skill will realize that these computers might interact differently in other embodiments. For instance, in some embodiments, the computer 115 does not send a confirmation of the receipt of a media file to the DRM server set. In some of these embodiments, the DRM server set on its own sends the set of keys to the computer 115.

Also, in the embodiments described above, the content-distribution system provides different cryptographic keys for decrypting different pieces of content. In other embodiments, the content-distribution system might utilize different encoding schemes for encrypting different pieces of content. For instance, the system might utilize a symmetric encoding scheme to encrypt audio content but utilize an asymmetric encrypting scheme to encrypt video content. Alternatively, the system might encrypt audio content in its entirety, while encrypting only parts of the video content. Also, one of ordinary skill will appreciate that some embodiments might use the cryptographic keys to directly decrypt the encrypted content pieces, or might use the keys to indirectly decrypt these pieces by decrypting one or more other keys that are used in the process for decrypting these pieces.

III. Content Storage Library and Synchronization with a Player

Figure 8:
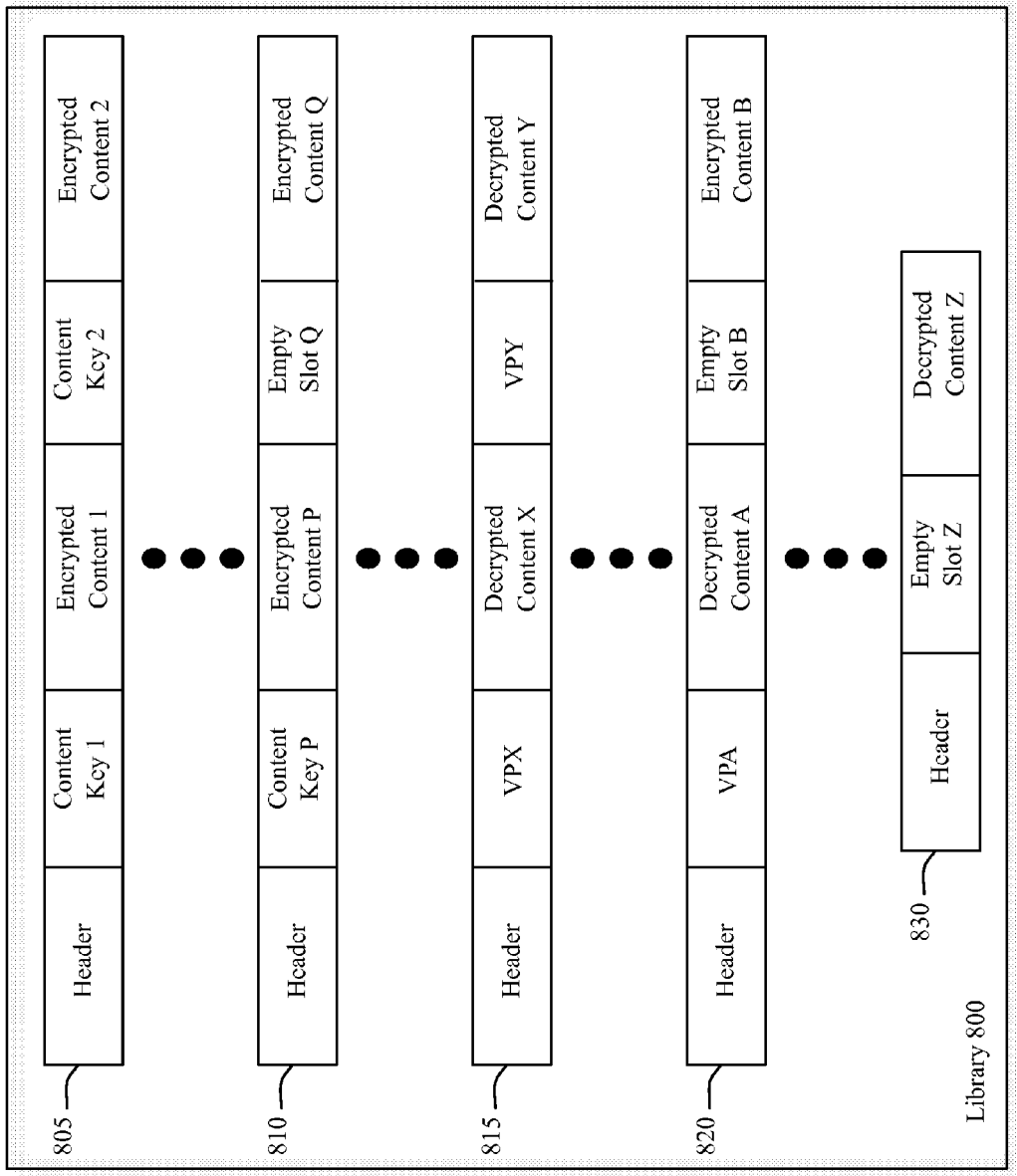
FIG. 8 illustrates a content storage library of some embodiments.

Through multiple iterations of the content-acquisition process 700, the computer 115 might obtains several different media files containing device-restricted and device-unrestricted content. FIG. 8 illustrates an example of a content storage library 800 that contains several media files (such as files 805 and 810) that contain device-restricted content, and several media files (such as files 815 and 820) that contain device-unrestricted content. In the storage library 800, the media files for device-restricted content include content keys for each acquired piece of content, while the media files for the device-unrestricted content include a verification parameter for each acquired piece of content. The storage library 800 also includes a media file 830 for a third type of content, which could be content that the user imports into the library in a way that does not involve the DRM and caching servers 105 and 110. For instance, the media file 830 might include content ripped from a compact disk or purchased from a third party. In some embodiments, the media file 830 has an empty slot in order to have the same format as the media files for the device-restricted and device-unrestricted content. In other embodiments, the media files for the third content type do not have an empty slot as they do not use the same format for all three content types.

In some embodiments, the computer 115 can synchronizes its content with a portable player that is also allowed access to the content. In some cases, this synchronization removes one or more pieces of content from a media file that the computer downloads to the portable player. In some cases, the pieces of content are removed in order to reduce the consumption of resources on the other device. In other cases, content is removed from the media storage structure because the other device does not have rights to access this other content.

Figure 9:
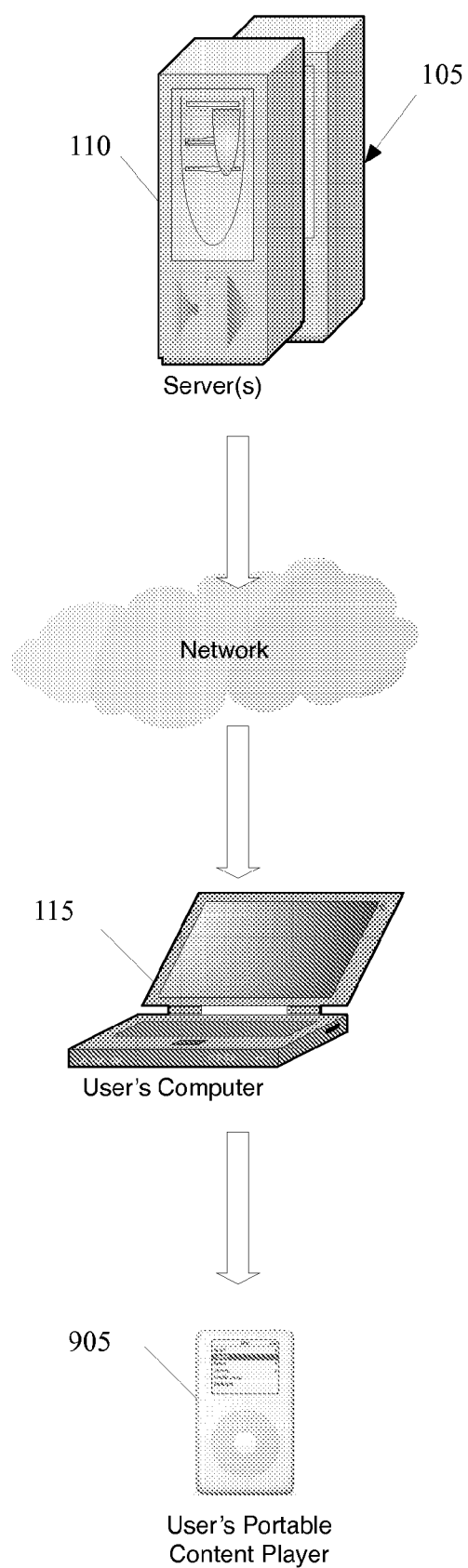
FIGS. 9 and 10 illustrate a synchronization operation of some embodiments of the invention.

FIG. 9 illustrates an example of the computer 115 synchronizing its DRM content with a portable player 905. The portable player can be a music player, audio/video player, a phone, etc. When the computer 115 synchronizes its content with the player 905, the portable player 905 in some embodiments receives the content from the computer 115. In addition, for device-restricted and device-unrestricted content, the player 905 also receives either (1) a content key for decrypting each piece of DRM content that it receives in case of device-restricted content, or (2) a verification parameter for authenticating each piece of content that it receives in case of device-unrestricted content. The portable player then stores the received content and the associated keys and/or verification parameters.

Figure 10:
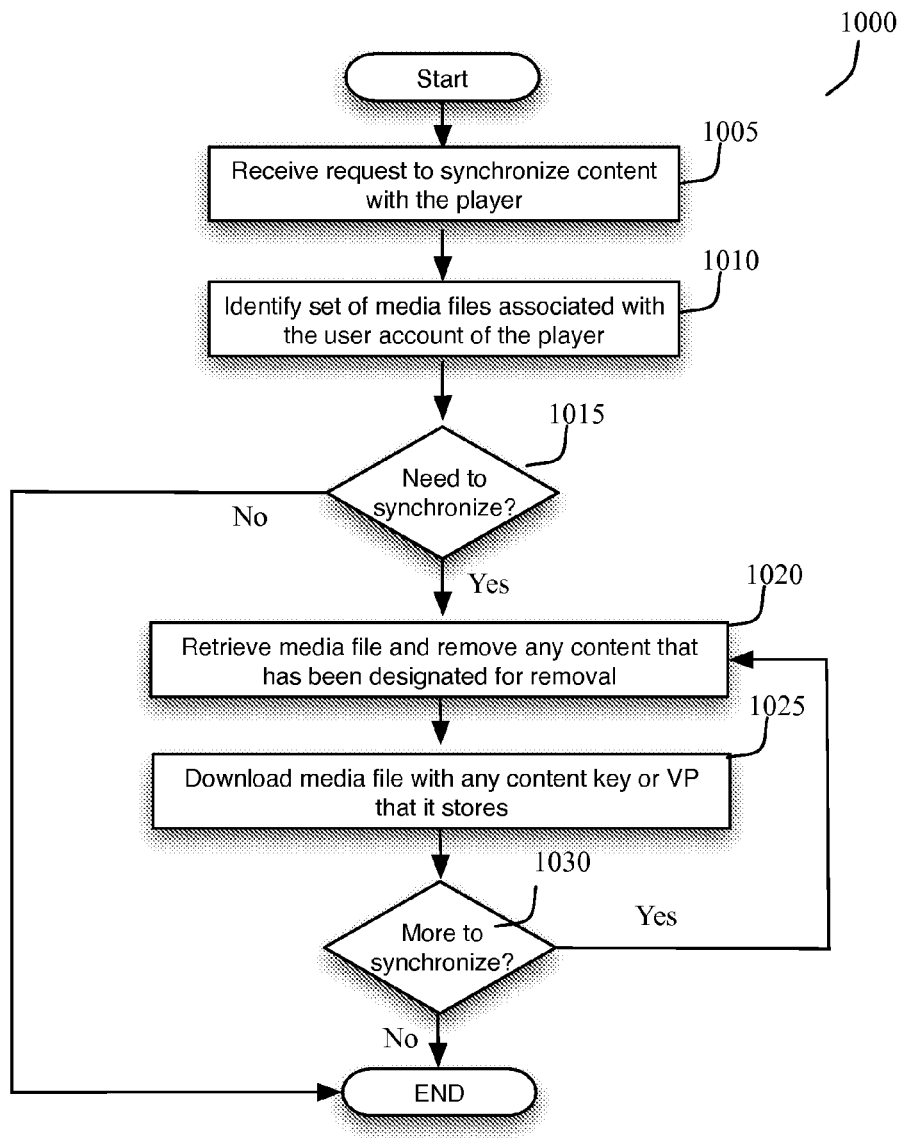

FIG. 10 conceptually illustrates a process 1000 that a computer 115 performs in some embodiments to synchronize a set of content with a player 905. As shown in this figure, the process 1000 starts (at 1005) when it receives a request to synchronize a set of content with the player 905. The process then identifies (at 1010) the set of media files that is associated with a user account ID of the player.

Next, the process determines (at 1015) whether the computer 115 is storing any media file for the player, which it has not yet downloaded to the player (i.e., whether there is any media file that needs to be synchronized between the computer and the player). If not, the process ends.

Otherwise, the process selects (at 1020) a media file that needs to be synchronized. At 1020, the process removes from the media file any piece of content that has been designated as content that should not be downloaded to the portable player. In some embodiments, the computer uses an application that allows a user to designate the content that the user wishes to synchronize with the portable player.

If the process removes (at 1020) any content from the media file, it also removes the content's associated content key or verification parameter from the media file in some embodiments of the invention. After 1020, the process downloads (at 1025) the media file that contains only the encrypted content that has to be synchronized with the player (i.e., downloads the media file after any content that should not be downloaded to the player has been removed). In some embodiments, the downloaded media file not only contains one or more pieces of content but also contains (1) one or more content keys that can be used to decrypt the content or (2) one or more verification parameters that can be used to authenticate the content. In some embodiments, the set of keys or parameters that is downloaded in the media file to the player is the same set that are used to decrypt or authenticate the content on the computer 115. In other embodiments, the keys or parameters in the downloaded media files are different than the keys or parameters used on the computer.

The player then stores (at 1025) the downloaded media file on its internal storage (e.g., its internal non-volatile storage, hard drive, flash memory, etc.). After 1025, the process determines (at 1030) whether there is any additional content for the player that it has not yet downloaded to the player (i.e., whether there is any additional content that needs to be synchronized between the computer and the player). If so, the process repeats 1020 and 1025 for a piece of content that needs to be synchronized. If not, the process ends.

FIG. 10 provides an illustrative example of synchronizing media files between a computer and a player in some embodiments of the invention. One of ordinary skill will realize that other embodiments use other processes for synchronizing media files. Also, in some embodiments, the portable player directly communicates with the DRM server and/or the content caching server to obtain content.

IV. Authentication Before Performing Operation or Service

In case of device-unrestricted content, some embodiments use the verification parameters associated with this content to authenticate it. In addition, the devices of some embodiments also use the verification parameters of such content to control whether a set of one or more operation or service can be provided for the content. In some embodiments, these operations or services do not include the playback of or access to the content on a device.

Figure 11:
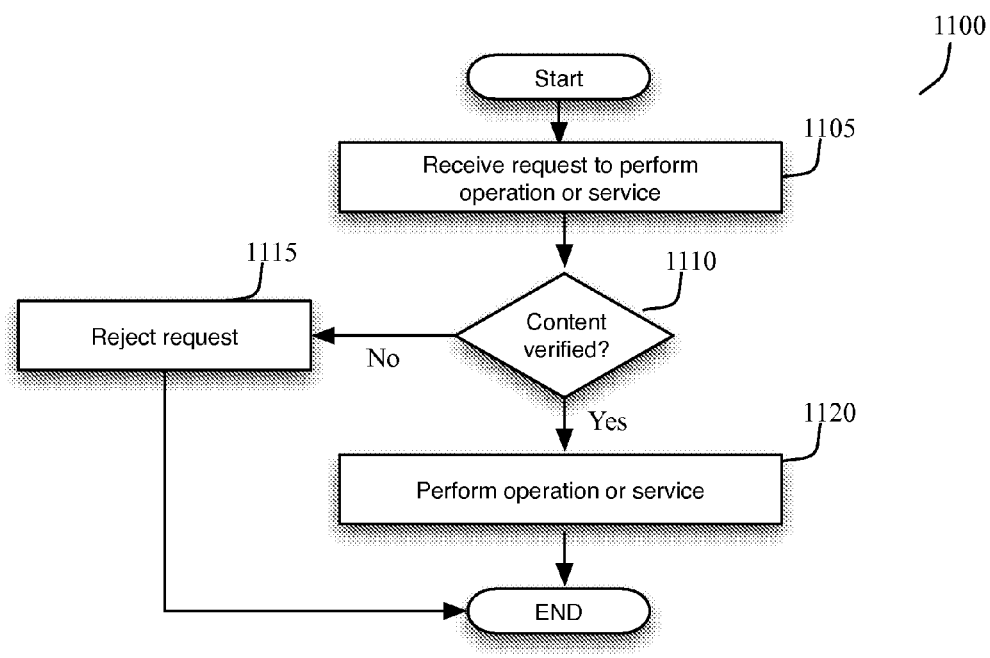
FIG. 11 illustrates an authentication operation that is performed based on a verification parameter associated with a piece of content.

FIG. 11 illustrates a process 1100 that some embodiments use to authenticate content before performing an operation or service for a device-unrestricted content. As shown in this figure, this process initially starts (at 1105) when it receives a request to perform an operation or service on a piece of content in a media file. One example of such a request is receiving a free upgrade associated with a piece of content. Another example would be receiving the latest release of a song or receiving a later release of video associated with a song. The media file might contain more than one piece of content. Hence, in some embodiments, the process 1100 is performed for each piece of content in the media file.

At 1110, the process tries to authenticate the piece of content by using the verification parameter that is stored in the media file for the piece of content. This authentication is performed differently in different embodiments of the invention. This authentication is different in different embodiments because the verification parameter stores different data in different embodiments of the invention.

In some embodiments, the process 1100 initially determines (at 1110) that the verification parameter is signed by the appropriate content-distribution source (e.g., a DRM server 110), in order to ensure that its associated content can be safely considered unaltered. Next, in some embodiments, the process examines (at 1110) one or more pieces of data contained in the verification parameter in order to authenticate it. For instance, in some embodiments, the verification parameter contains the identity of the distribution source of the content. In some of these embodiments, this identity is cryptographically protected (e.g., is encrypted) in the verification parameter. The devices in some such embodiments use the verification parameter to identify the content's source in order to determine whether the content 150 has been obtained from the appropriate distribution source.

In other embodiments, the verification parameter does not identify the distribution source but provides other indicia that the process 1100 can use (at 1110) to authenticate that the content has been provided by the appropriate distribution source. For example, in some embodiments, a content piece's verification parameter provides a complete or partial hash signature of the content piece (i.e., a signature that is generate by generating a hash of the entire content or of one or more parts of the content). Accordingly, in these embodiments, the process uses a symmetric or asymmetric hash verification process to authenticate the hash content contained in the verification parameter.

When the process is able to verify (at 1110) a piece of content, it performs (at 1120) the requested operation or service for the piece of content and then ends. Otherwise, when the process is not able to verify (at 1110) the piece of content, it rejects (at 1115) the request and then ends. In some embodiments, each piece of content in a media file with multiple content pieces needs to be authenticated before performing any operation or service on any or all the pieces of contents in the media file.

V. Encryption

As described above, several embodiments of the invention provide processes and systems for distributing content. These processes and systems encrypt and decrypt content based on cryptographic keys. Encrypting content entails transforming the content from a decipherable form (called plaintext) into an indecipherable form (called ciphertext) based on one or more cryptographic keys. Decrypting content entails transforming encrypted content into a decipherable from by using one or more cryptographic keys.

An encryption key is a piece of information that controls the operation of a cryptography algorithm. In symmetrical encryption technology, the key that is used to encrypt content is the same key that is used to decrypt content. In asymmetric encryption technology, the same key is not used to encrypt and decrypt the content. For instance, in one scheme, an encrypting device uses a public key of a recipient to encrypt content, and the recipient uses its private key to decrypt the encrypted content.

Many of the features of the embodiments described above can be implemented according to a symmetrical or asymmetrical encryption approach. Also, in some embodiments, the encryption is applied to a binary format of the content. Although the unencrypted binary format of a piece of content may be hard for a human to decipher, it can be deciphered by an application or an operating system. On the other hand, encrypted binary format of a piece of content ideally should not be deciphered by any application or operating system, without first being decrypted by using one or more cryptographic keys.

VI. System Diagram

Figure 12:
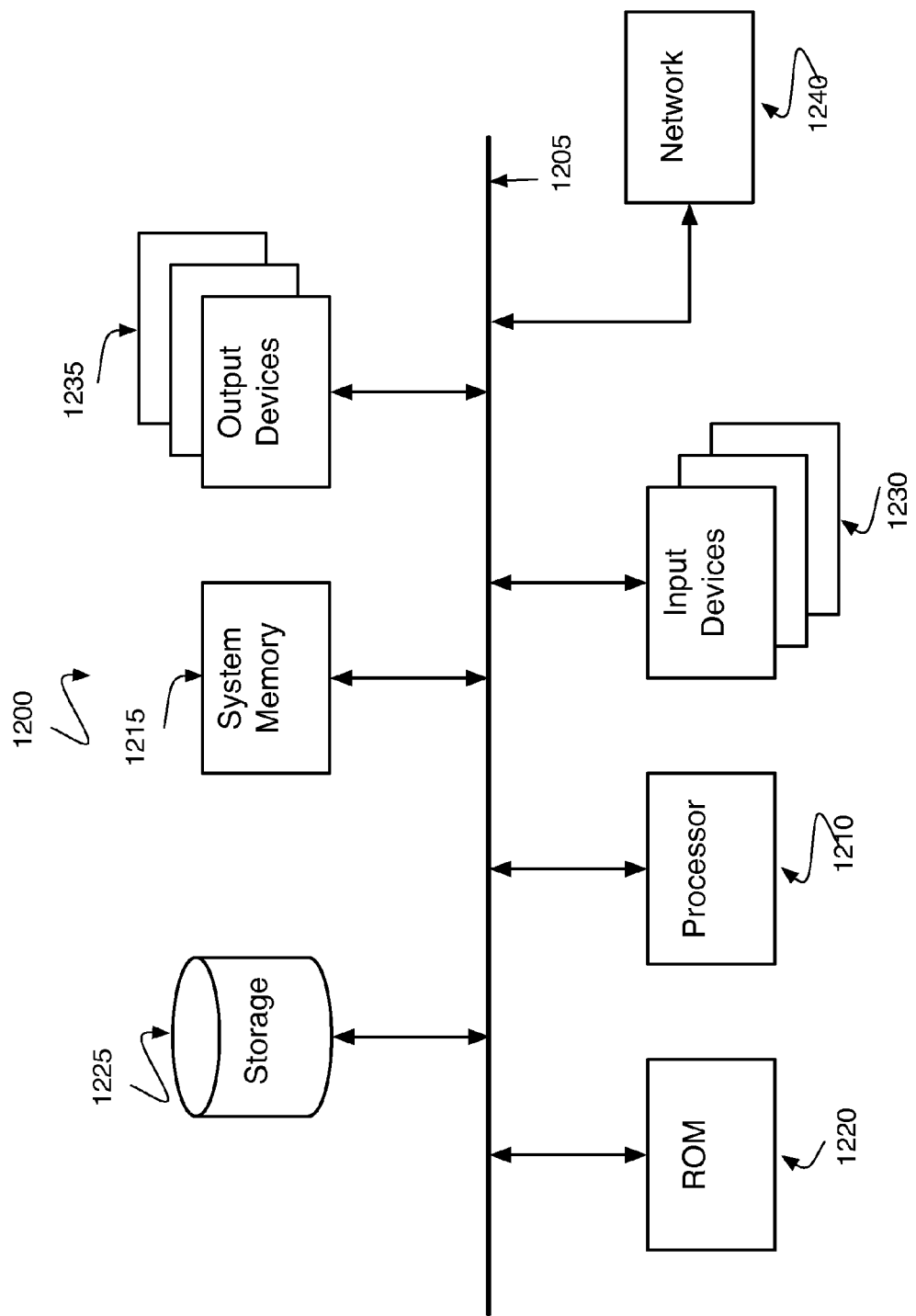
FIG. 12 illustrates a system diagram that conceptually illustrates the components of a typical DRM server, caching server, user computer, or portable device that implements some embodiments of the invention.

FIG. 12 presents a system diagram that conceptually illustrates the components of a typical DRM server, caching server, user computer, or portable device that implements some embodiments of the invention. System 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that support communication among internal devices of the system 1200. For instance, the bus 1205 communicatively connects the processor 1210 with the read-only memory 1220, the system memory 1215, and the permanent storage device 1225.

One or more of the various memory units (1215, 1225, etc.) store the above-described data structures with the content pieces, verification parameters, and content keys. From these various memory units, the processor 1210 retrieves instructions to execute and data to process in order to execute the processes of the invention. The read-only-memory (ROM) 1220 stores static data and instructions that are needed by the processor 1210 and other modules of the system.

The permanent storage device 1225, on the other hand, is a read-and-write memory device. This device is a non-volatile memory unit that stores instruction and data even when the system 1200 is off. Some embodiments of the invention use a mass-storage device (such as a magnetic or optical disk and its corresponding disk drive) as the permanent storage device 1225. Other embodiments use a removable storage device (such as a memory card or memory stick) as the permanent storage device.

Like the permanent storage device 1225, the system memory 1215 is a read-and-write memory device. However, unlike storage device 1225, the system memory is a volatile read-and-write memory, such as a random access memory. The system memory stores some of the instructions and data that the processor needs at runtime. In some embodiments, the invention's processes are stored in the system memory 1215, the permanent storage device 1225, and/or the read-only memory 1220.

The bus 1205 also connects to the input and output devices 1230 and 1235. The input devices enable the user to communicate information and select commands to the system. The input devices 1230 include alphanumeric keyboards and cursor-controllers. The output devices 1235 display images generated by the system. The output devices include printers and display devices, such as cathode ray tubes (CRT) or liquid crystal displays (LCD).

Finally, as shown in FIG. 12, certain configurations of the system 1200 also include a network adapter 1240 that connects to the bus 1205. Through the network adapter 1240, the system can be a part of a network of computers (such as a local area network ("LAN"), a wide area network ("WAN"), an Intranet or a network of networks, e.g., the Internet). Any or all of the components of system 1200 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium of a device storing a program comprising sets of instructions for:
   receiving, from a first set of computers, a first structure with a device-restricted first content piece, the first structure comprising a slot for holding a first content key for decrypting the first content piece each time the first content piece is accessed;
   receiving, from the first set of computers, a second structure with a device-unrestricted second content piece, the second structure having a similar format to the first structure, the second structure comprising a slot for holding a verification parameter for authenticating the second content piece;
   receiving, from a second set of computers, (i) the first content key, (ii) the verification parameter, and (iii) a second content key for decrypting the second content piece;
   inserting the first content key in the slot of the received first structure;
   decrypting the second content piece using the second content key and subsequently discarding the second content key;
   inserting the verification parameter in the slot of the received second structure;
   storing the first and second structures in a storage of the device;
   receiving a request to perform an operation on the second content piece; and
   allowing the performance of the operation only if the second content piece is authenticated by using the verification parameter to verify that the second content piece originated from a particular source, wherein when the second content piece does not have its associated verification parameter in the second structure, the operation cannot be performed as the second content piece cannot be authenticated.

2. The non-transitory computer readable medium of claim 1, wherein the program further comprises a set of instructions for requesting the second content piece, wherein the second structure, the verification parameter, and the second content key are received in response to the request.

3. The non-transitory computer readable medium of claim 1, wherein the program further comprises a set of instructions for authenticating the second content piece with the verification parameter.

4. The non-transitory computer readable medium of claim 1, wherein the verification parameter is signed by the particular source.

5. The non-transitory computer readable medium of claim 1, wherein the verification parameter identifies the particular source.

6. The non-transitory computer readable medium of claim 1, wherein the verification parameter comprises data that is cryptographically tied to the second content piece.

7. The non-transitory computer readable medium of claim 1, wherein the verification parameter comprises data that includes a hash signature of at least one part of the second content piece.

8. The non-transitory computer readable medium of claim 1, wherein the received second structure holds a plurality of device-unrestricted content pieces and comprises a plurality of slots for holding a plurality of verification parameters, each verification parameter for authenticating a different device-unrestricted content piece in the second structure.

9. The non-transitory computer readable medium of claim 8, wherein the program further comprises sets of instructions for:
   receiving the plurality of verification parameters from the second set of computers; and
   inserting each of the received verification parameters into a different slot of the received second structure.

10. The non-transitory computer readable medium of claim 1, wherein the first piece of content is encrypted in the first structure.

11. The non-transitory computer readable medium of claim 1, wherein the program further comprises sets of instructions for receiving a third structure with a third content piece, the third structure having a similar format to the first and second structures, the third structure comprising an empty slot.

12. The non-transitory computer readable medium of claim 11, wherein the third structure is received from a different source than the first and second structures.

13. For an electronic device that accesses content, a method comprising:
   receiving, from a first set of computers, a first structure with a device-restricted first content piece, the first structure comprising a slot for holding a first content key for decrypting the first content piece each time the first content piece is accessed;
   receiving, from the first set of computers, a second structure with a device-unrestricted second content piece, the second structure having a similar format to the first structure, the second structure comprising a slot for holding a verification parameter for authenticating the second content piece;
   receiving, from a second set of computers, (i) the first content key, (ii) the verification parameter, and (iii) a second content key for decrypting the second content piece;
   inserting the first content key in the slot of the received first structure;
   decrypting the second content piece using the second content key and subsequently discarding the second content key;
   inserting the verification parameter in the slot of the received second structure;
   storing the first and second structures in a storage of the device;
   receiving a request to perform an operation on the second content piece; and
   allowing the performance of the operation only if the second content piece is authenticated by using the verification parameter to verify that the second content piece originated from a particular source, wherein when the second content piece does not have its associated verification parameter in the second structure, the operation cannot be performed as the second content piece cannot be authenticated.

14. The method of claim 13 further comprising requesting the second content piece, wherein the second structure, the verification parameter, and the second content key are received in response to the request.

15. The method of claim 13 further comprising authenticating the second content piece with the verification parameter.

16. The method of claim 13, wherein the verification parameter is signed by the particular source.

17. The method of claim 13, wherein the verification parameter identifies the particular source.

18. The method of claim 13, wherein the verification parameter comprises data that is cryptographically tied to the second content piece.

19. The method of claim 13, wherein the verification parameter comprises data that includes a hash signature of at least one part of the second content piece.

20. The method of claim 13, wherein the received second structure holds a plurality of device-unrestricted content pieces and comprises a plurality of slots for holding a plurality of verification parameters, each verification parameter for authenticating a different device-unrestricted content piece in the second structure.

21. The method of claim 20 further comprising:
receiving the plurality of verification parameters from the second set of computers; and
inserting each of the received verification parameters into a different slot of the received second structure.

22. The method of claim 13, wherein the first piece of content is encrypted in the first structure.

23. The method of claim 13 further comprising receiving a third structure with a third content piece, the third structure having a similar format to the first and second structures, the third structure comprising an empty slot.

24. The method of claim 23, wherein the third structure is received from a different source than the first and second structures.

* * * * *